(12) United States Patent
Bertrand et al.

(10) Patent No.: US 9,267,263 B2
(45) Date of Patent: **\*Feb. 23, 2016**

(54) DEVICE FOR ESTABLISHING A FLOAT CONDITION IN A HYDRAULICALLY SPRUNG LOADER LIFT CYLINDER ARRANGEMENT AFTER FLUID SUPPLY IS DECOUPLED

(71) Applicant: Deere & Company, Moline, IL (US)

(72) Inventors: Hugues Bertrand, Rioz (FR); Damien Faivre, Apremont (FR)

(73) Assignee: DEERE & COMPANY, Moline, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,180

(22) Filed: Sep. 30, 2014

(65) Prior Publication Data
US 2015/0093225 A1    Apr. 2, 2015

(30) Foreign Application Priority Data

Oct. 1, 2013 (DE) .......................... 10 2013 219 931
Oct. 1, 2013 (DE) .......................... 10 2013 219 936
Oct. 31, 2013 (DE) .......................... 10 2013 222 165

(51) Int. Cl.
| | |
|---|---|
| *E02F 3/627* | (2006.01) |
| *E02F 3/42* | (2006.01) |
| *E02F 3/34* | (2006.01) |
| *E02F 3/36* | (2006.01) |
| *A01B 1/00* | (2006.01) |
| *B62D 49/00* | (2006.01) |
| *E02F 9/22* | (2006.01) |
| *A01B 59/06* | (2006.01) |

(52) U.S. Cl.
CPC . *E02F 3/422* (2013.01); *A01B 1/00* (2013.01); *B62D 49/00* (2013.01); *E02F 3/34* (2013.01); *E02F 3/3695* (2013.01); *E02F 3/627* (2013.01); *E02F 9/2203* (2013.01); *E02F 9/2217* (2013.01); *A01B 59/064* (2013.01); *F15B 2211/3058* (2013.01); *F15B 2211/625* (2013.01); *F15B 2211/7128* (2013.01)

(58) Field of Classification Search
CPC ........ A01B 59/064; E02F 3/627; E02F 3/422; E02F 9/2203
USPC ................................... 414/686; 172/272–275
See application file for complete search history.

(56) References Cited

U.S. PATENT DOCUMENTS 6,386,821 B1 *  5/2002  Schneider ..................... 414/686
6,951,103 B2    10/2005 Berthod et al.
(Continued)

FOREIGN PATENT DOCUMENTS

| | | |
|---|---|---|
| DE | 3630976 A1 | 3/1987 |
| EP | 1774106 81 | 10/2008 |
| FR | 2571452 A1 | 4/1986 |

OTHER PUBLICATIONS

John Deere, Automatic Mast Latch under load Concept (2 pages), date unknown (relates to design in production before invention of subject matter of this Application).

*Primary Examiner* — Dean Kramer

(57) ABSTRACT

A front loader arrangement includes a hydraulically sprung lift cylinder arrangement coupled between opposite loader arm sides and respectively mounting masts. In order to permit the masts to pivot freely about their pivotal connections with the loader arm sides to aid the coupling of the masts to respective mounting frames fixed to a carrying vehicle, the hydraulic system in which the lift cylinder arrangement is incorporated includes a device, including a shut-off valve and an accumulator arrangement for establishing a float condition in the lift cylinder arrangement after a source of hydraulic fluid and associated control valve is decoupled by separating a hydraulic quick coupler.

7 Claims, 11 Drawing Sheets

(56) References Cited

U.S. PATENT DOCUMENTS

| | | | |
|---|---|---|---|
| 6,986,634 B2 * | 1/2006 | Westendorf et al. | 414/686 |
| 7,353,885 B2 * | 4/2008 | Nordhoff | 172/272 |
| 7,530,779 B2 * | 5/2009 | Holloway et al. | 414/686 |
| 7,549,832 B2 * | 6/2009 | Mailleux | 414/686 |
| 7,632,056 B2 | 12/2009 | Nilsson | |
| 8,500,386 B2 | 8/2013 | Griffiths et al. | |

* cited by examiner

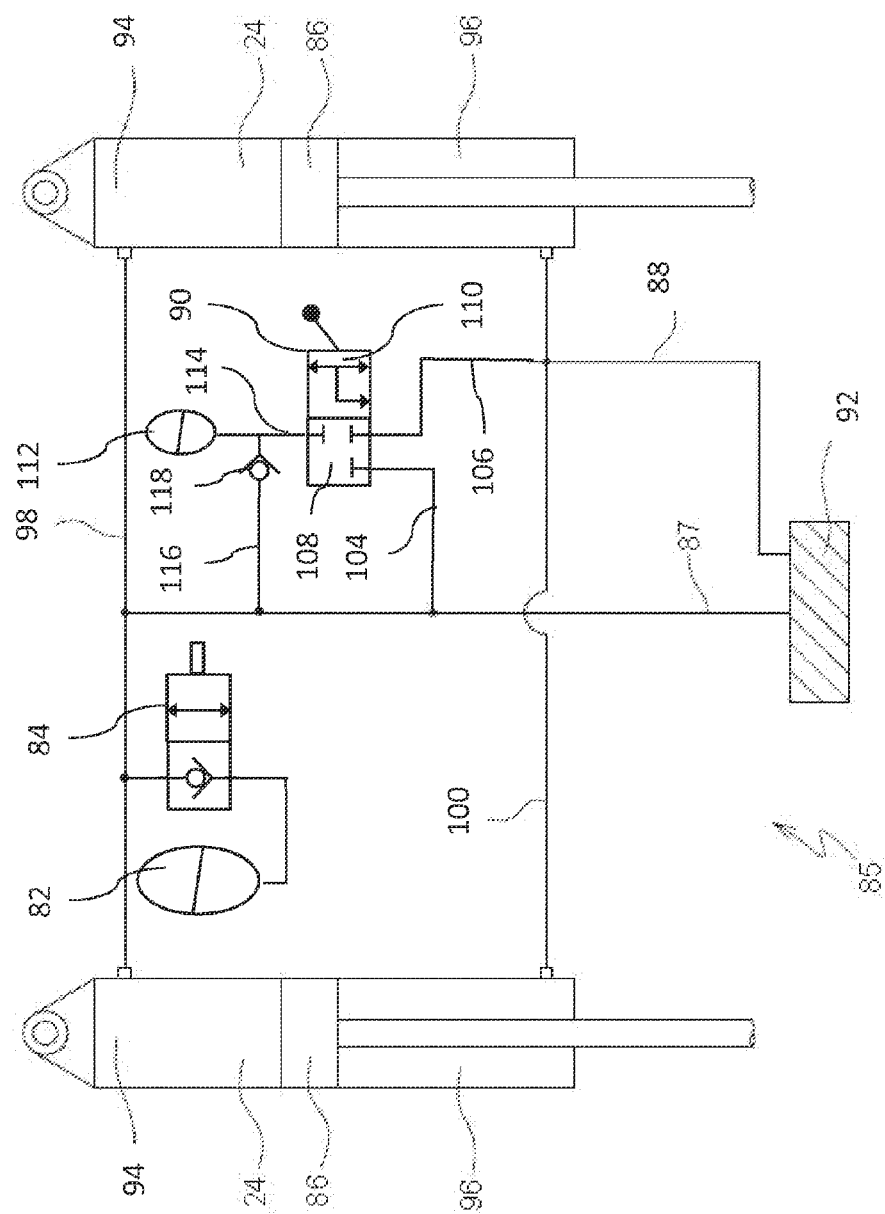

DEVICE FOR ESTABLISHING A FLOAT CONDITION IN A HYDRAULICALLY SPRUNG LOADER LIFT CYLINDER ARRANGEMENT AFTER FLUID SUPPLY IS DECOUPLED

FIELD OF THE INVENTION

The invention relates to a front loader arrangement with a mounting frame and a mounting mast, wherein the mounting mast can be coupled to the mounting frame and can be decoupled therefrom, with a front loader arm which is connected to the mounting mast for being pivoted vertically by a hydraulic cylinder extending between the front loader arm and the mounting mast, wherein the hydraulic cylinder is formed in a double-acting manner with a rod end chamber and a head end chamber, and with a device for the hydraulic spring suspension of the front loader arm, wherein the device comprises a hydraulic accumulator in conjunction with a control valve controlled by load pressure.

BACKGROUND OF THE INVENTION

Front loader arrangements, i.e., the arrangement of a front loader on a vehicle, in particular on an agricultural vehicle, or else on a different type of utility vehicle, are known. Front loaders can be connected to, or mounted on, a vehicle, for example on a tractor or an agricultural tractor, by means of a mounting frame, in order to carry out loader operations. The mounting frame is customarily screwed to the vehicle frame or fastened to the latter. The front loader itself has a connecting or mounting point or mounting mast which is connected to, or is mounted on, or coupled to, the console. Various possibilities are known in this respect. Some known exemplary embodiments of front loader arrangements have mechanisms which are formed on the console and serve for receiving two bearing bolts formed on the mast arrangement of the front loader, wherein at least one of the catch hooks is locked after receiving the bearing bolts. The bearing bolts are received here by the mounting frame being guided up to, or the vehicle being driven up to, the mounting mast or to the front loader which is in a corresponding parking position or mounting position. After the bearing bolts have been received, the catch hooks can be locked manually or else in a partially automated or fully automated manner or by an external motor or by remote control. In other mechanisms, the console has only one catch hook which serves for receiving a bearing bolt formed on the mast arrangement. For locking purposes, connecting openings are then formed both on the mounting frame and mounting mast, with the connecting openings, when brought into alignment with each other, being connected to each other via a locking bolt, or a locking bolt is guided through the mast. The locking can also take place here manually or else in a partially automated or fully automated manner or by an external motor or by remote control.

Such a partially automated locking is disclosed in U.S. Pat. No. 7,632,056, granted Dec. 15, 2009 which presents a front loader arrangement which comprises a spring pre-tensioned locking bolt which can be actuated via adjusting elements formed on a mounting mast and on a mounting frame by the adjusting elements, by means of a relative movement with respect to one another, triggering a locking in such a manner that the locking bolt is guided by spring force into connecting openings formed on the mounting mast and on the mounting frame of the front loader arrangement. For unlocking purposes, the locking bolt has to be guided manually out of the connecting openings counter to the spring force and the adjusting elements have to be brought into a corresponding unlocking position. It is disadvantageous in this connection that, in particular, the design and arrangement of the adjusting element formed on the mast arrangement, and also the connection of said adjusting element to the locking bolt require a relatively complex outlay in terms of manufacturing and installation.

Furthermore, EP 1 774 106 B1 discloses a front loader arrangement, in which the mounting mast is guided via a ramp formed on the mounting fame wherein the mounting frame has catch hooks in which bearing bolts formed on the mounting mast are received. The front loader arrangement can be locked via a spring pre-tensioned spring-loaded locking catch, which engages in a first depression and then a second depression formed on the frame, wherein a pre-locking is formed here, in which the spring-loaded locking catch engages in the first depression and the mounting mast is still movable relative to the mounting frame until the mounting mast reaches the end position thereof, in which the bearing bolts have been fully inserted into the catch hooks. Only then does the spring-loaded locking catch snap into the second depression, at which final locking arises. Disadvantages here include the fact that, firstly, the design and arrangement of the spring-loaded locking catch provided on the mounting mast and, furthermore, the first and second depressions which are formed on the mounting frame and are intended for the pre-locking and final locking require a relatively complex outlay in terms of manufacturing and installation and also a great diversity of components.

SUMMARY OF THE INVENTION

The problem on which the invention is based is considered that of specifying a front loader arrangement of the type mentioned at the beginning, by means of which one or more of the above-mentioned disadvantages are overcome.

The object is achieved according to the invention by the teaching of claim 1. Further advantageous refinements and developments of the invention emerge from the dependent claims.

According to the invention, a front loader arrangement of the type mentioned at the beginning is designed in such a manner that adjusting means, by means of which the hydraulic cylinder can be brought into a floating position when a hydraulic fluid supply and associated control valve carried on the carrying vehicle is decoupled, are provided on the front loader arrangement, wherein the adjusting means comprise a shut-off valve which has a first and a second switching position, wherein, in the first switching position, a fluid connection, which operates via the shut-off valve, can be produced between the head end and rod end chambers. A fluid connection between the head end and the rod end chambers of the hydraulic cylinder ensures that the hydraulic cylinder is brought into a floating position. As a result, the mounting mast can move relatively freely and is not blocked by the hydraulic cylinder, as is otherwise customary during the coupling, since a hydraulic connection between vehicle and front loader arrangement has been disconnected during the decoupling and, during the coupling, can only be actuated by an operator in a further step if the mounting mast has been coupled to the mounting frame. The mounting frame can comprise, for example, a ramp on which the mounting mast is guided for being displaced along the ramp for the coupling and decoupling. By means of the floating position, the mounting mast can be pivoted about the coupling point thereof with respect to the front loader arm, i.e. relative to the loader arm, and, for example during the coupling, can be adapted to a positioning angle with respect to the mounting frame or aligned with respect to the latter. An alignment takes place here by the bearing bolts of the mounting mast sliding over the ramp during the coupling and being guided into the catch hooks, wherein, by means of this interaction, the bearing bolts are brought into the position thereof provided for the coupling. Without the abovementioned floating position of the hydraulic cylinder, the mounting mast would be in a rigid connection with respect to the front loader arm such that the mounting mast cannot carry out any pivoting movements relative to the front loader arm. Therefore, should the geometrical dimensions between vehicle and front loader arrangement have changed during a time in which the front loader arrangement was decoupled from the vehicle, which is entirely possible, for example due to location instabilities (ground unevenness, subsidence of the ground, etc.), change in the filling of the tyres of the vehicle, changes to the tyre size, leakages in the hydraulics of the front loader device or because of other circumstances, then a change in the positioning angle of the mounting mast with respect to the mounting frame is generally also associated therewith, as a result of which the next coupling of the front loader arrangement is made considerably more difficult, since, because of the rigid connection between mounting mast and front loader arm, the entire front loader arrangement (apart from the mounting frame) has to be raised, displaced, lowered, tilted, etc., and therefore also the entire weight of the front loader arrangement has to be moved until the mounting mast has been aligned in a manner corresponding to the mounting frame. The shut-off valve is preferably opened directly after the front loader is decoupled from the vehicle, with a hydraulic supply from the vehicle for the hydraulic cylinder of the front loader arrangement (operating hydraulics) customarily also being interrupted or decoupled, as a result of which the hydraulic cylinder is already held in a floating position and is prepared for the next coupling. Of course, the shut-off valve can also be opened just immediately before the next coupling. Although a manual opening can be provided here, this will only ensure that the floating position for the hydraulic cylinder can be set irrespective of the vehicle hydraulics or of operating hydraulics for the front loader arrangement. It is entirely also conceivable here to provide a mechanical or electric device for opening the shut-off valve if said device can be operated independently of the operating hydraulics of the front loader or ensures the opening of the shut-off valve independently of operating hydraulics, i.e. enables the shut-off valve to open if a connection to the operating hydraulics is interrupted.

In the first switching position, a fluid connection, which at the same time also operates via the shut-off valve, can be produced between the head end chamber, the rod end chamber and the hydraulic accumulator. The hydraulic accumulator which is provided in any case for the hydraulic spring suspension of the front loader arrangement can therefore be fluidly connected to the head end and rod end chambers by opening of the shut-off valve, wherein the volume differences or the cross-sectional differences between the two chambers are compensated for by the hydraulic accumulator.

In the second position, a fluid connection, which operates via the shut-off valve, between the head end chamber, the rod end chamber and the hydraulic accumulator is interrupted. In this position, the hydraulic spring suspension is fully functional, i.e. the hydraulic accumulator can be operated solely via the load-pressure-controllable control valve and also the hydraulic cylinder is ready for use for lifting and lowering the front loader arrangement.

In an alternative embodiment, a further hydraulic accumulator is provided, and, in the first switching position, a fluid connection, which operates via the shut-off valve, is produced between the head end chamber, the rod end chamber and the further hydraulic accumulator. The manner of operation here is unchanged with respect to the manner of operation described above, except that use is made of, for example, a smaller hydraulic accumulator, and therefore, in the floating position, the freedom of movement can be improved because of smaller accumulator pressures. The further hydraulic accumulator is used here solely for producing the floating position of the hydraulic cylinder. The hydraulic accumulator provided for the hydraulic spring suspension is not used in this case. This is expedient in particular if high spring rates are provided for the hydraulic spring suspension such that the hydraulic accumulator provided for the hydraulic spring suspension has a relatively high spring pressure number which is disproportionately high for use for the floating position function.

In the second switching position, a fluid connection, which operates via the shut-off valve, between the head end chamber, the rod end chamber and the further hydraulic accumulator is interrupted. In this position, the hydraulic spring suspension is fully functional, and the further hydraulic accumulator is isolated, i.e. the hydraulic accumulator can be operated solely via the load-pressure-controllable control valve and also the hydraulic cylinder is ready for use for lifting and lowering the front loader arrangement.

A bypass line which is provided with a check valve is arranged between the further hydraulic accumulator and the head end chamber, wherein the check valve closes in the direction of the further hydraulic accumulator. It is thereby ensured that the further hydraulic accumulator, in an isolated state, can be relieved of pressure via the bypass line, for example if the hydraulic accumulator is heated by solar irradiation.

The above-described front loader arrangement can be used on various carrier vehicles, but in particular on agricultural vehicles, such as tractors.

The invention and further advantages and advantageous developments and refinements of the invention will be described and explained in more detail below with reference to the drawing which shows two exemplary embodiments of the invention.

BRIEF DESCRIPTION OF THE DRAWINGS

In the drawing:

FIG. 12 is a schematic hydraulic diagram of a further embodiment for a front loader arrangement with a hydraulic spring suspension and adjusting means for producing a floating position for the hydraulic cylinders.

DESCRIPTION OF THE PREFERRED EMBODIMENT

Figure 1:
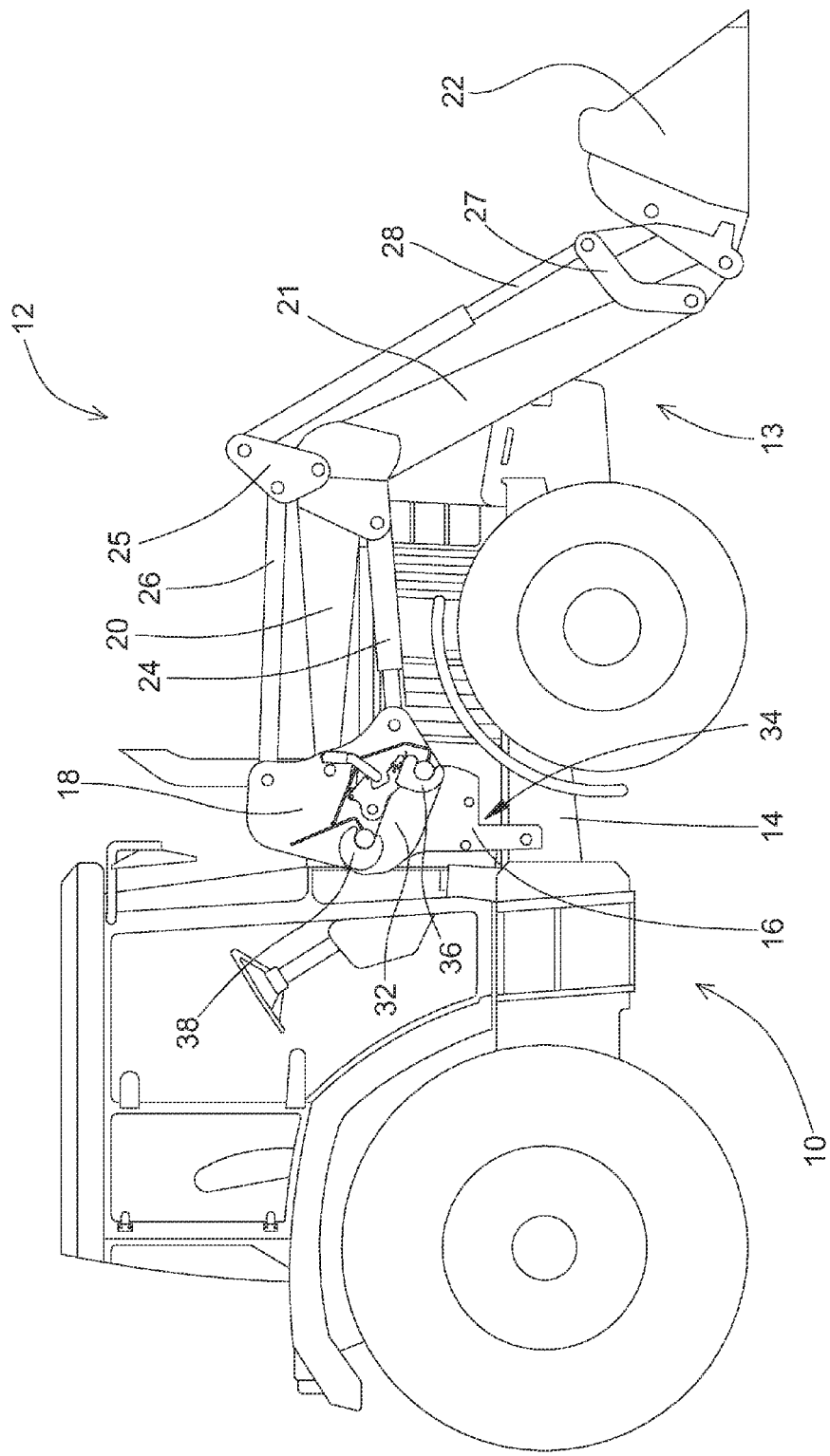
FIG. 1 is a schematic side view of an agricultural vehicle with a front loader arrangement.

FIG. 1 illustrates an agricultural vehicle in the form of a tractor 10 (carrier vehicle). The tractor 10 has a mounted front loader arrangement 12. The front loader arrangement 12 comprises a front loader 13 and mounting frame 16, which are mounted on a vehicle frame 14 of the tractor 10 on both sides of the tractor 10, for the coupling of the front loader 13. The front loader 13 has a mounting mast 18, likewise on both sides of the tractor, by means of which the front loader 13 is coupled to the mounting frame 16 of the front loader arrangement 12 and therefore to the tractor 10.

The front loader arrangement 12 or the front loader 13 has a front loader arm 20 which has a rear end pivotally fastened to the mounting mast 18 and has a forward end to which a front loader tool 22 is pivotally connected. The front loader arm 20 comprises a pair of parallel carriers 21 which run in parallel on the opposite sides of the tractor 10 and are connected to each other via one or more transverse carriers (not shown). The front loader tool 22 is designed, by way of example, in the form of a loading shovel, wherein the front loader tool 22 could also be designed as loading forks, grippers, etc. The front loader arm 20 is pivoted relative to the mounting mast 18 via a pair of hydraulic lifting cylinders 24 which respectively extend at opposite sides of the tractor 10 between an adjacent one of the pair of mounting masts 18 and an adjacent one of the pair of carriers 21 of the front loader arm 20. A tilting linkage 26, which serves for the parallel guidance of the front loader tool 22, extends in each case between links 25, which are pivotally connected to the carriers 21 of the front loader arm provided on the opposite sides of the tractor 10, and the respective mounting masts 18. The front loader tool 22 is pivotally connected to front ends of the carriers at both sides of the front loader arm 20 via a pivoting linkage 27, which is connected between a front region of the loader arm 20 and to backside locations of the front loader tool 22, and also via a hydraulic pivoting cylinder 28 which is connected to the respective pivoting linkage 27 and to the respective link 25.

The mounting frame 16 has a receiving region 32 for receiving or for the coupling of the mounting mast 18, and a fastening region 34 for fastening the mounting frame 16 to the vehicle frame 14. At the fastening region 34, the mounting frame 16 is screwed to the vehicle frame 14 via screw connections (not shown). The mounting frame 16 has a first (front) catch hook 36 on a lower front region of the receiving region 32 and a second (rear) catch hook 38 on an upper rear region of the receiving region 32, or hook-shaped bearing points in each case.

FIGS. 2 to 8 illustrate a respective combination of the mounting mast 18 and mounting frame 16 at the right side of the front loader arrangement 12 in enlarged form in a plurality of side views and in a plurality of cross-sectional views, in which further individual details of the front loader arrangement 12 are illustrated in detail.

The mounting frame 16 has a ramp 40 or ramp-shaped configuration which extends between the front and rear catch hooks 36 and 38, and, in the lower region of the ramp, a depression or notch 42 is defined directly to the rear of the lower or front catch hook 36.

The mounting mast 18 comprises an upper bearing point and a lower bearing point respectively in the form of an upper bearing bolt 44 and a lower bearing bolt 46. It is conceivable here for the combination of catch hooks 36, 38 and bearing bolts 44, 46 also to be able to be realized in a manner the other way around, such that the bearing bolts 44, 46 are formed on the mounting frame 16 and the catch hooks 36, 38 are formed on the mounting mast 18. Furthermore, an upper pivoting bolt 48, a central pivoting bolt 50 and a lower pivoting bolt 52 are arranged on the mounting mast 18, with the pivoting bolts respectively pivotally connecting the tilt linkage 26, the front loader arm 20 and the hydraulic cylinder 24 to the mounting mast 18.

Figure 9:
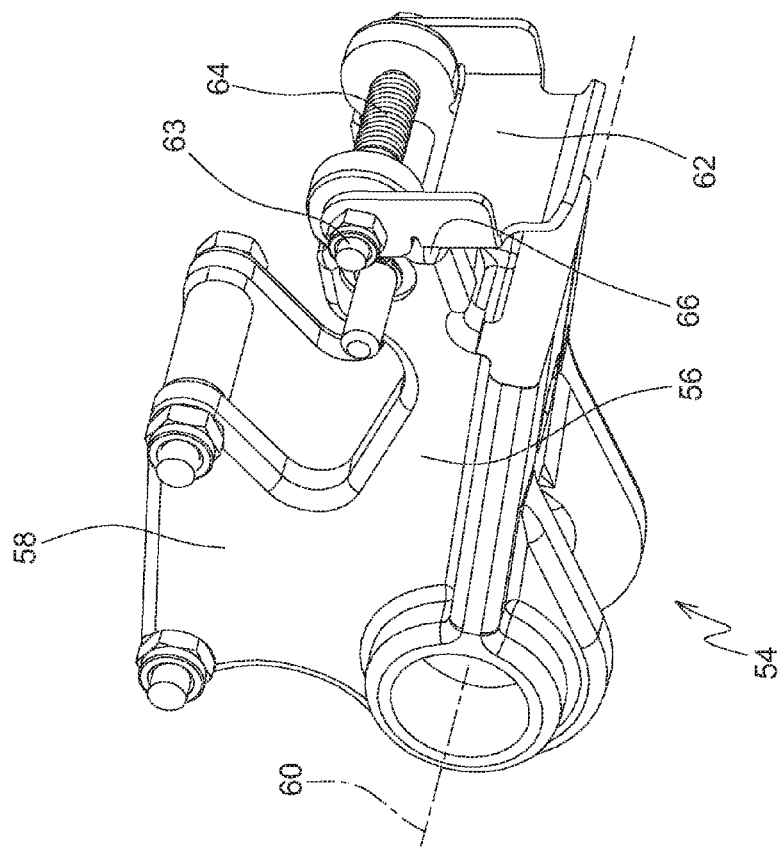
FIG. 9 is a perspective side view of the pivoting lever of the mounting mast from FIGS. 2 to 8.

The mounting mast 18 furthermore comprises a pivoting locking bar 54 (also see FIG. 9) which has a first and second arms 56 and 58, respectively, joined together and mounted for pivoting about a pivot axis 60. An adjusting means in the form of a supporting means 62, which is designed in the form of a supporting hinge, is arranged at a free end of the first pivoting arm 56. The supporting means 62 is hinged or pivotally coupled to a free end of the first pivoting arm 56 by means of a joint 63 and is pre-tensioned by means of a spiral spring 64 in such a manner that said supporting means is pressed or pushed against the end of the first pivoting arm 56 and, in an extreme position, comes to bear against an end surface 66 formed at the free end of the end of the pivoting arm 56. The lower side of the first pivoting arm 56, i.e., that side of the pivoting arm 56 which faces the ramp 40, has a step 68 which is formed in a complementary manner to the depression 42 formed on the ramp 40.

The second pivoting arm 58 of the pivoting locking bar 54 is designed to be shorter and is arranged above the first pivoting arm 56, offset at an angle of approximately 70° (counterclockwise in the figures) and forms a further lever arm about the pivot axis 60 of the pivoting locking bar 54. The second pivoting arm 58 is connected to a frame part 72 of the mounting mast 18 via a tension spring 70, and therefore the pivoting locking bar 54 is pre-tensioned in the direction of the ramp 40.

Figure 10:
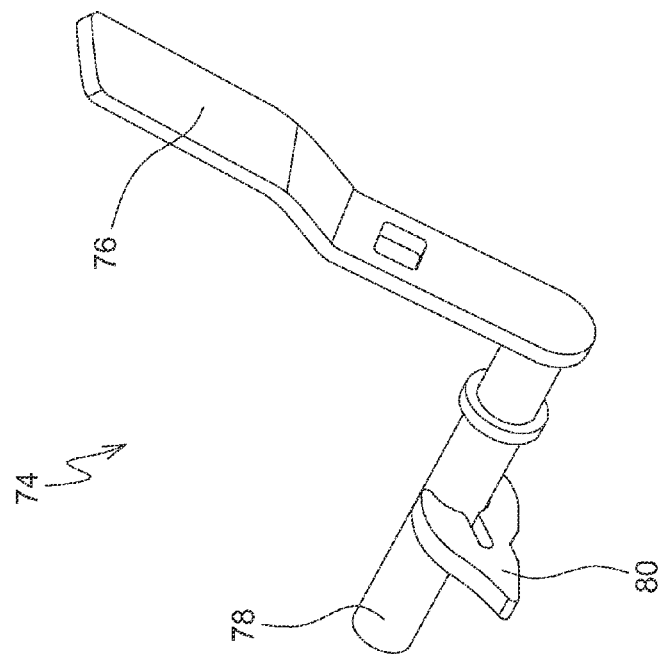
FIG. 10 is a perspective side view of the actuating device for the pivoting locking bar of the mounting mast from FIGS. 2 to 8.

An actuating element 74 (see FIG. 10), via which the pivoting locking bar 54 can be actuated, is arranged between the first and second arms 56 and 58. The actuating element 74 includes an actuating lever 76 which is accessible on the outside of the mounting mast 18 and extends radially from a shaft 78. The shaft 78 is mounted for rotation in the mounting mast 18 at a location between the first and second arms 56 and 58. An adjusting arm 80 is formed in a central region of the shaft 78, the adjusting arm extending radially from the shaft 78 and being formed and arranged in such a manner that it can be brought into engagement with the second arm 58 of the pivoting locking bar 54 upon rotation of the shaft 78, this rotation causing the locking bar 54 to be set into a pivoting movement. The shaft here is set into rotation by pivoting the actuating lever 76 from a basic position (FIGS. 2 to 5, 7 and 8), into an engagement position (corresponding to FIG. 6), whereupon the adjusting arm 80 likewise pivots and is brought into engagement with the upper pivoting arm 58 and therefore with the pivoting locking bar 54, and the pivoting locking bar 54 can be moved from a locking position (see FIG. 5) into an unlocking position (see FIG. 6). The pivoting arm 58, and therefore also the pivoting locking bar 54, is released again by pivoting the shaft 78 in the reverse direction.

Figure 2:
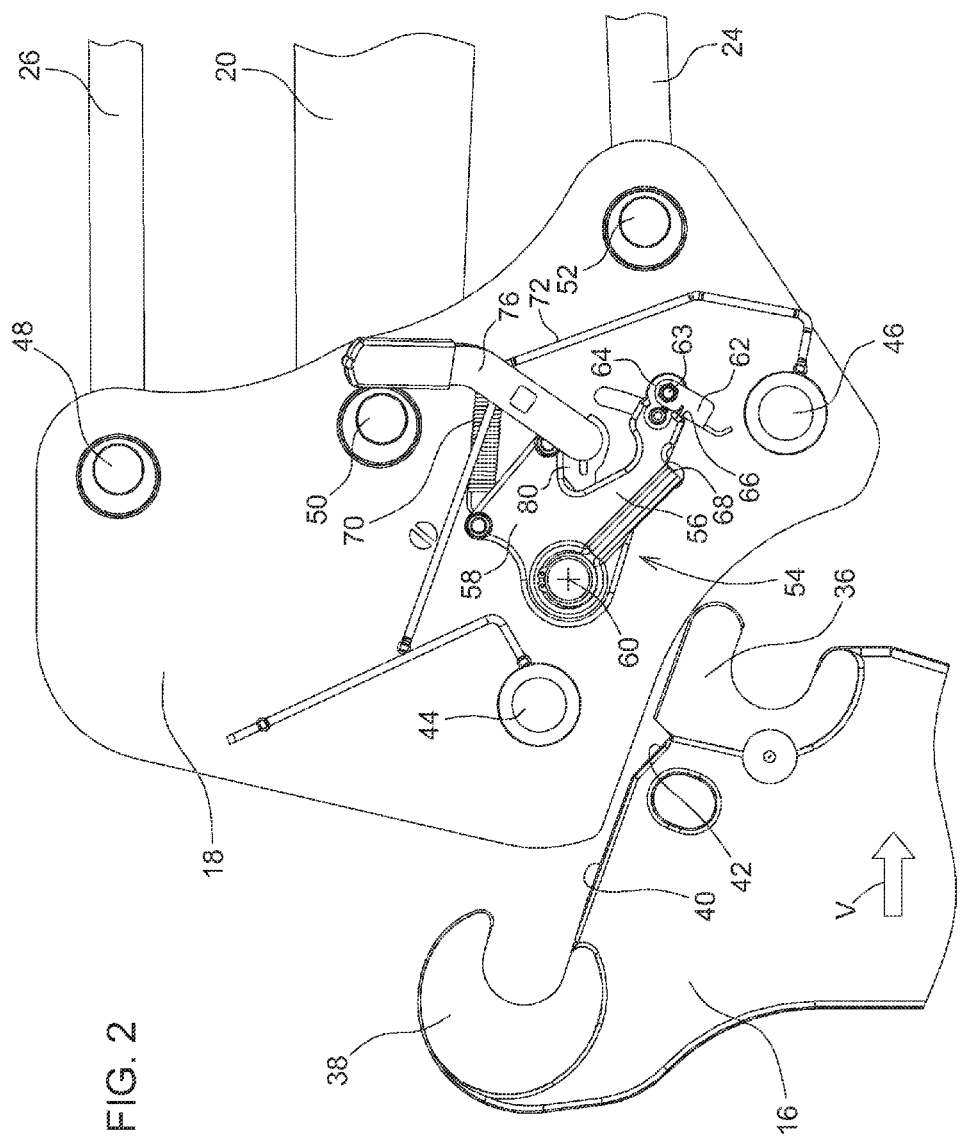
FIG. 2 is a schematic side view of a mounting mast in cross section and of a mounting frame of the front loader arrangement from FIG. 1 in a decoupled state.
Figure 3:
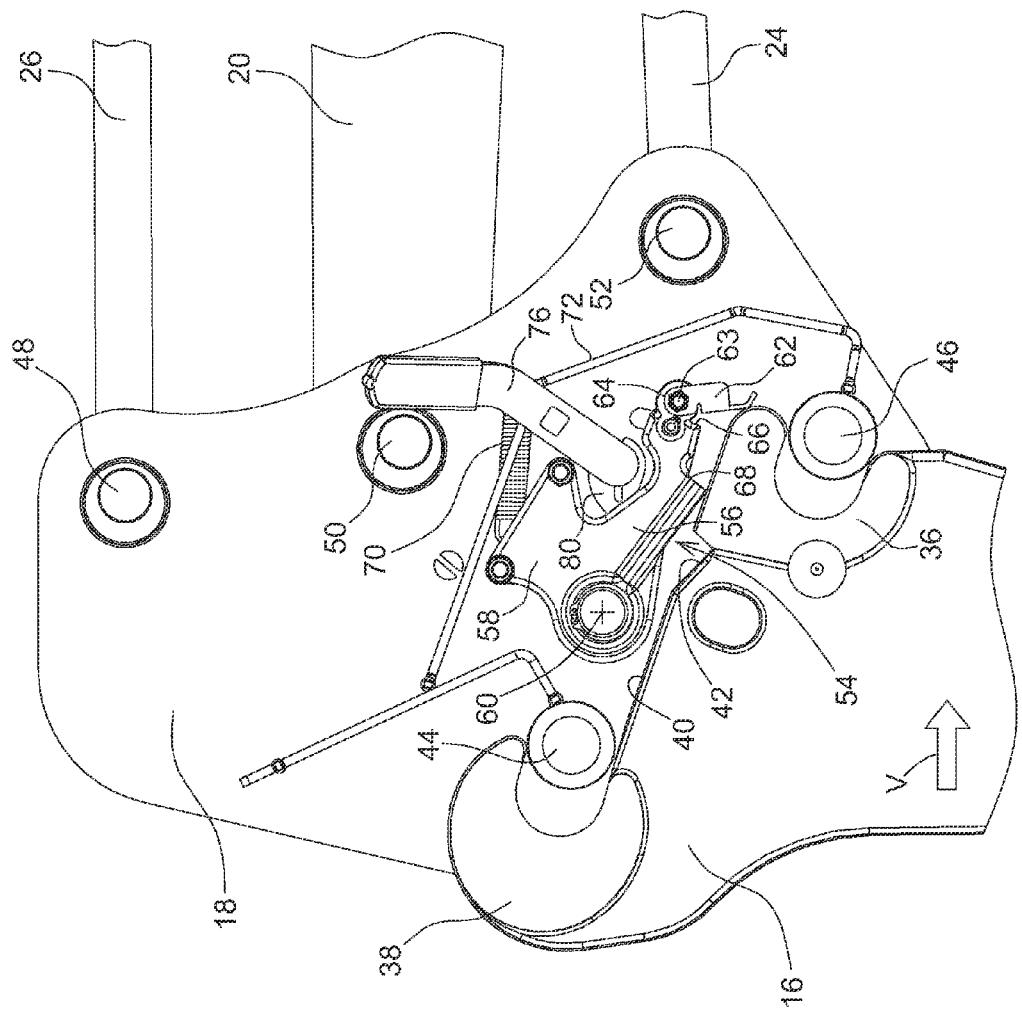
FIG. 3 is a further schematic side view of the mounting mast and of the mounting frame from FIG. 2 in a first coupling state.
Figure 4:
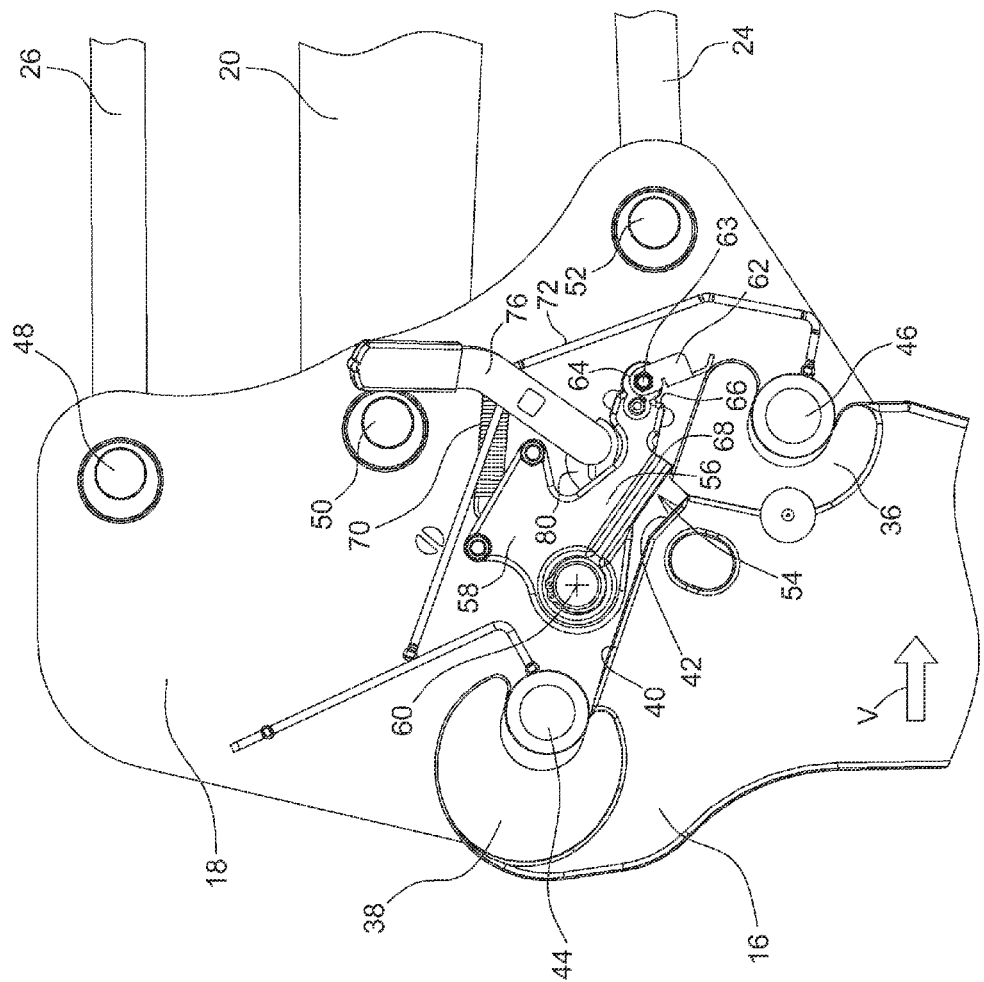
FIG. 4 is a further schematic side view of the mounting mast and of the mounting frame from FIGS. 2 and 3 in a further coupling state.
Figure 5:
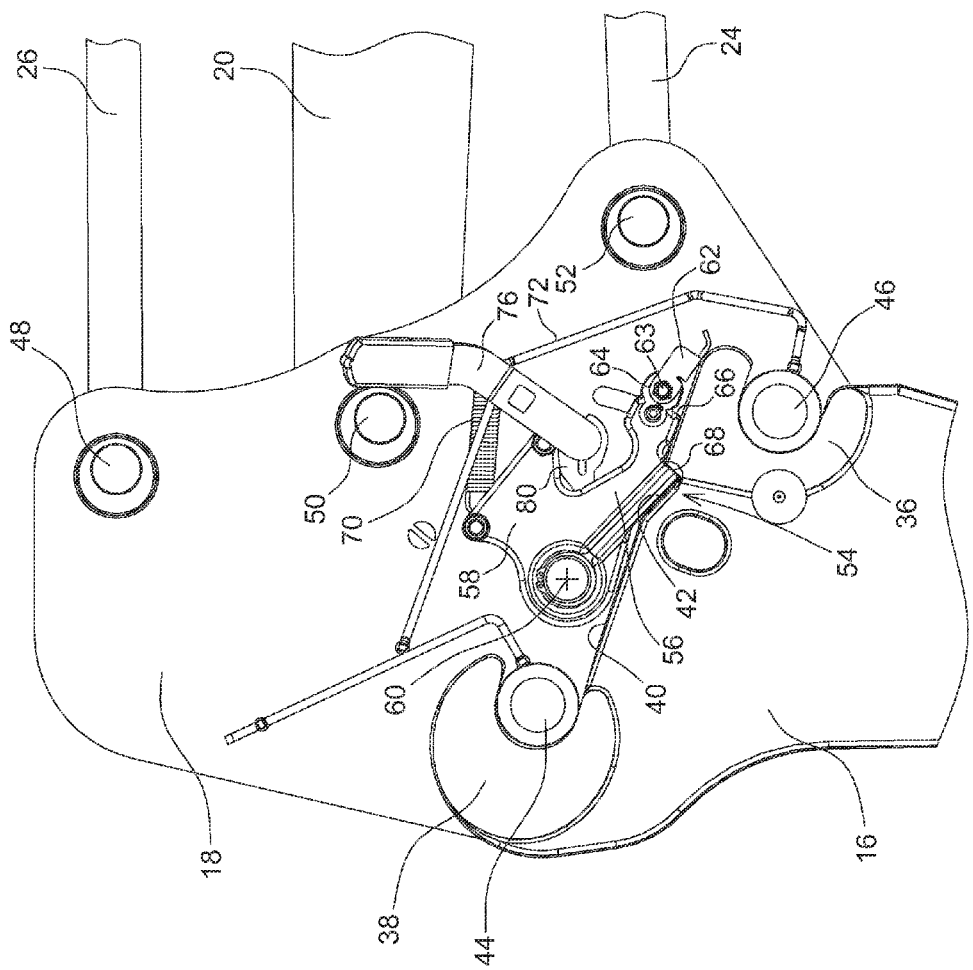
FIG. 5 is a further schematic side view of the mounting mast of the mounting frame from FIGS. 2 to 4 in a coupled state.
Figure 6:
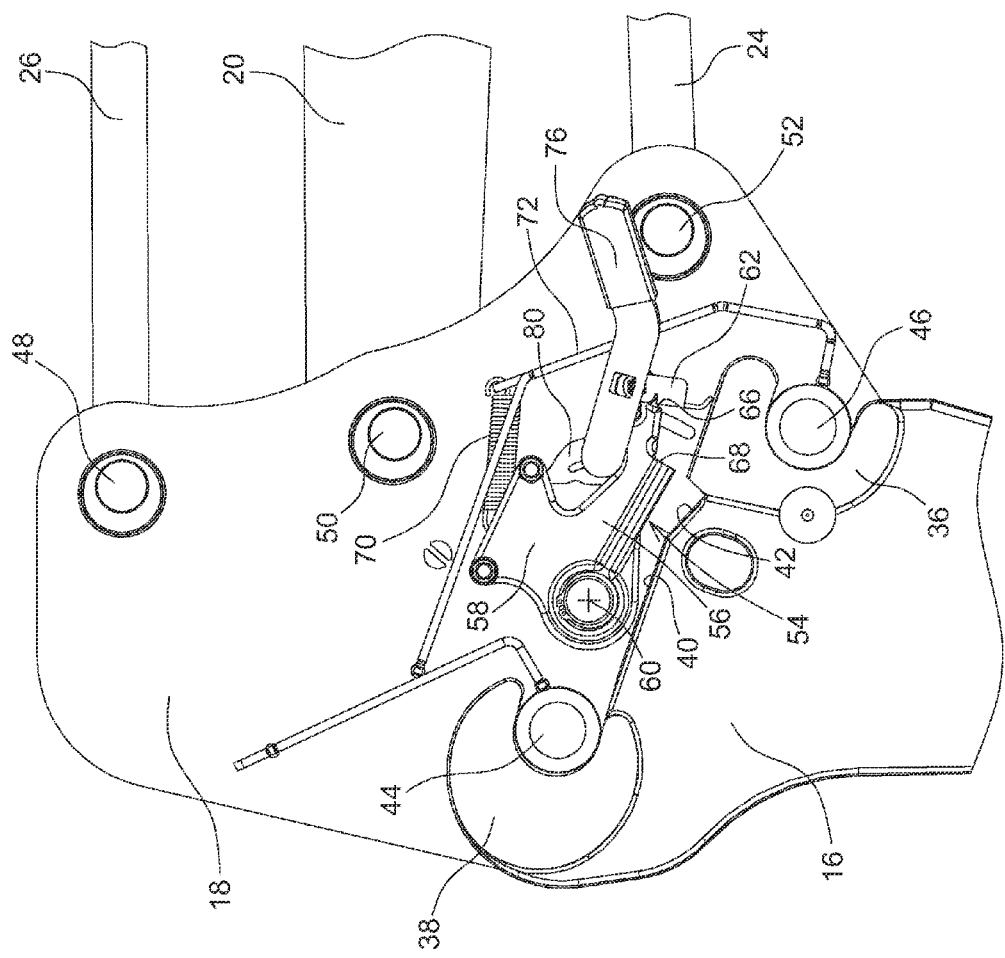
FIG. 6 is a further schematic side view of the mounting mast and of the mounting frame from FIGS. 2 to 5 in a first coupling state.
Figure 7:
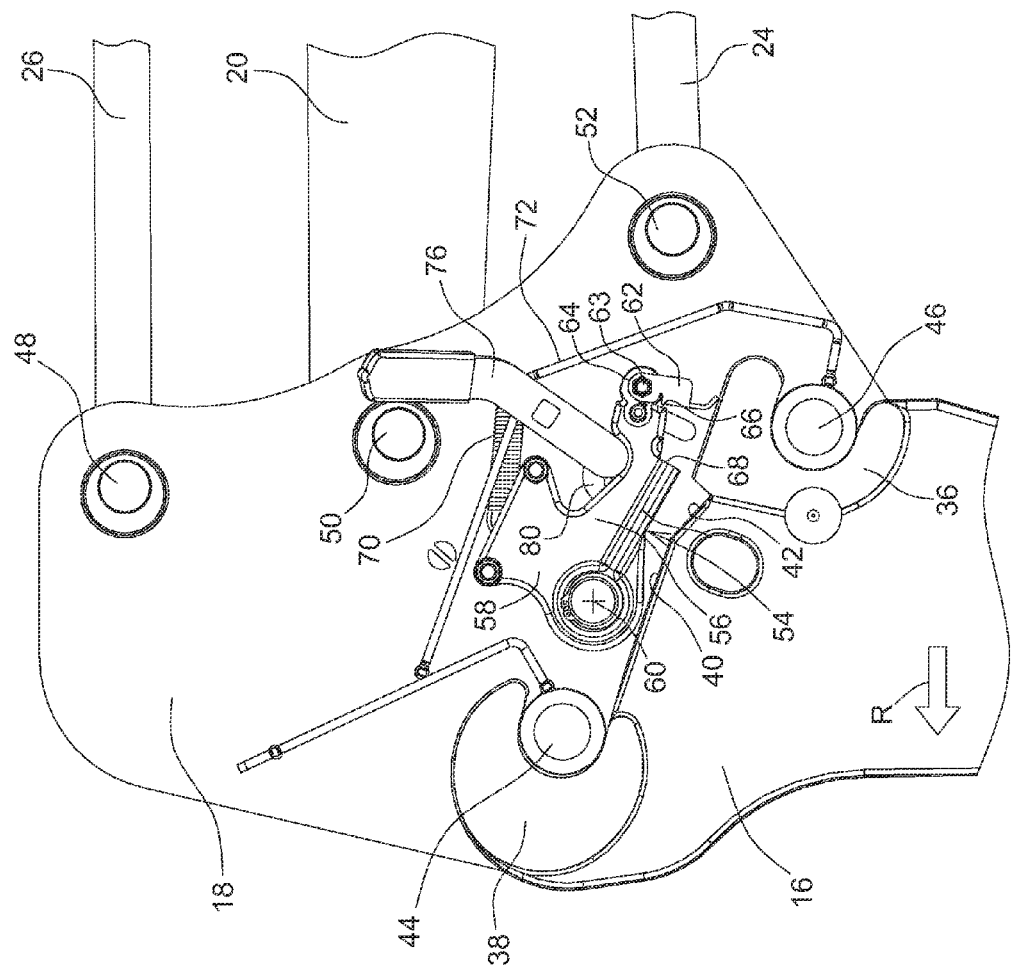
FIG. 7 is a further schematic side view of the mounting mast and the mounting frame from FIGS. 2 to 6 in a further decoupling state.
Figure 8:
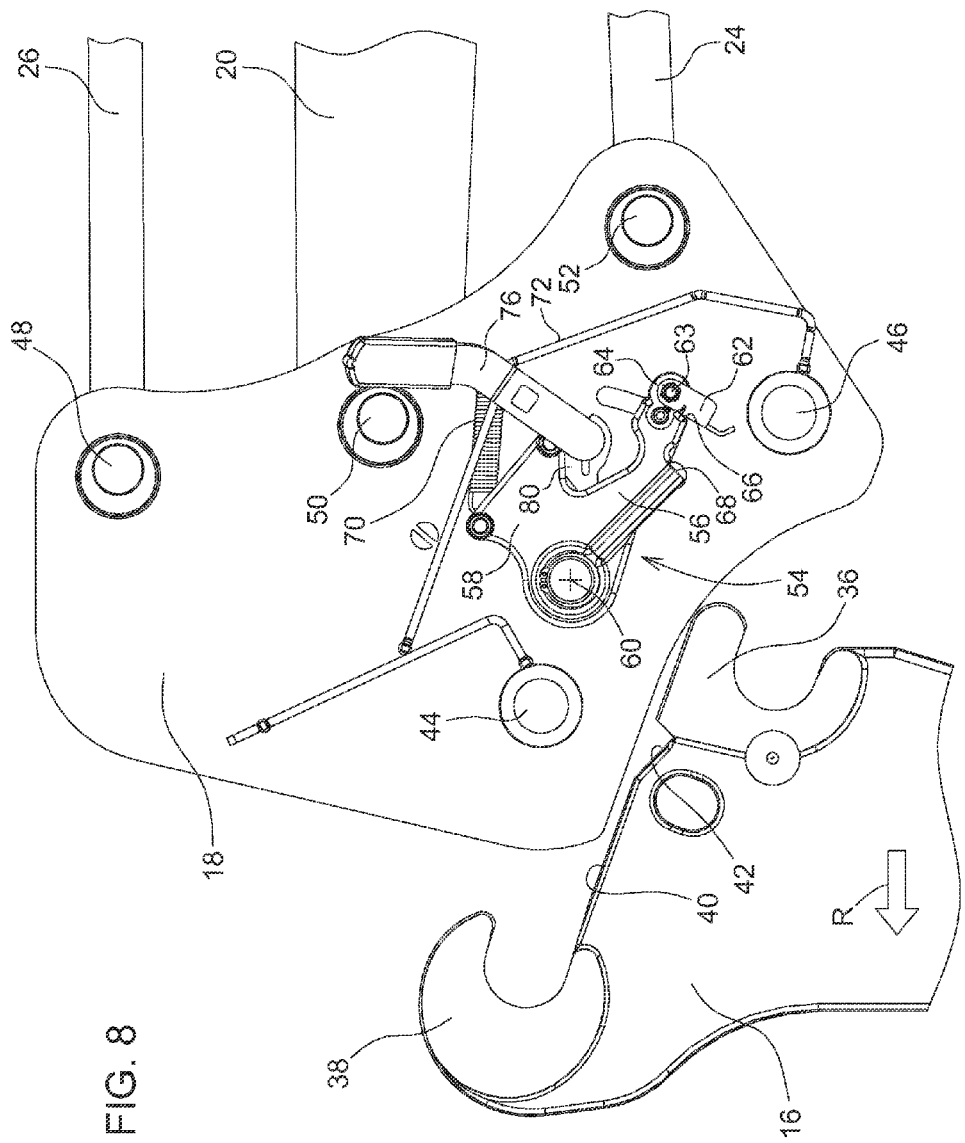
FIG. 8 is a further schematic side view of the mounting mast and the mounting frame from FIGS. 2 to 7 in a decoupled state.

The front loader 13 or the mounting mast 18 is coupled to, or decoupled from, the mounting frame 16 as described below with reference to FIGS. 2 to 8. The mounting frame 16 is moved from a decoupled state, in which the front loader 13 is set down and is separated hydraulically and mechanically from the tractor, in the direction of the mounting mast 18 corresponding to the movement indicated by the arrow V (FIG. 2). The upper bearing bolt 44 begins to enter into engagement with the ramp 40 and slides up along the inclined plane of the ramp 40 and along the ramp surface until the bearing bolt enters into engagement with the upper catch hook 38 (FIGS. 3 and 4). At this same time, the lower bearing bolt 46 enters into engagement with the lower catch hook 36 (FIGS. 3 and 4). Approximately at the time at which the bearing bolts 44, 46 enter into engagement with the catch hooks 38, 36 (FIG. 3), the lower catch hook 36, or a lower end of the ramp 40, abuts against the supporting means 62 and begins to pivot the latter counter to the pre-tensioning thereof from the position thereof, which is oriented substantially perpendicularly to the ramp surface and in which the supporting means takes up the supporting position, into an increasingly deflected position (see FIGS. 3 to 5). When the supporting position of the supporting means 62 is cancelled, the spring 70 on the pivoting locking bar 54 causes the latter to move with the lower pivoting arm 56 thereof in the direction of the ramp surface 40 such that, finally, the step 68 of the lower pivoting arm 56 comes to bear against the ramp 40 and slides up along the ramp (FIGS. 3 and 4). As can best be seen in FIG. 5, the mounting mast 18 reaches an end position relative to the mounting frame 16, in which end position the bearing bolts 44, 46 come to bear completely in the catch hooks 38, 36. At the same time, the spring pre-tensioned pivoting locking bar 54 takes up the locking position thereof and latches with the step 68 formed on the first pivoting arm 56 in the depression 42 such that the mounting mast 18 is locked to the mounting frame 16, since relative movement between mounting mast 18 and mounting frame 16 is now blocked firstly by the catch hooks and secondly by the step 68 which has come to bear in the depression 42. The front loader is now in the operating position and can be put into operation. FIGS. 6 to 8 show the unlocking of the front loader, i.e., the decoupling of the mounting mast 18 from the mounting frame 16. The pivoting locking bar 54 is brought here from the locking position thereof into an unlocking position by means of the actuating element 74, as described above (FIG. 6). At the same time, the spring pre-tensioned supporting means 62 can thereby take up the supporting position thereof and the pivoting locking bar 54 can be released again from the actuating element 74 by the actuating lever being brought again into the basic position thereof. The pivoting locking bar 54 is now held in the unlocking position by the supporting means 62. In this state, the mounting mast 18 is unlocked from the mounting frame 16, and therefore the mounting frame 16 can be removed from the mounting mast 18, as indicated by the arrow R in FIGS. 7 and 8. By means of the relative movement between mounting mast 18 and mounting frame 16 and the sliding of the supporting means 62 along the ramp surface, the supporting means 62 is pushed against the end surface 66 of the pivoting arm 56, as a result of which the supporting means maintains the supporting position thereof and the pivoting locking bar 54 cannot snap back into the depression (FIG. 7). By moving the mounting frame 16 away, i.e., by backing the tractor 10, the mounting frame 16 can now be removed from the mounting mast 18, i.e., from the front loader 13, so that the decoupling of the mounting mast 18 from the mounting frame 16 is finished (FIG. 8). So that the front loader 13 can be completely separated and removed from the tractor 10, first the hydraulic supply of the lifting cylinder 24 has to be decoupled. The operator can undertake this in parallel with the unlocking of the pivoting locking bar 54, i.e., in a working sequence wherein the pivoting locking bar 54 is unlocked and the hydraulic supply disconnected.

Figure 11:
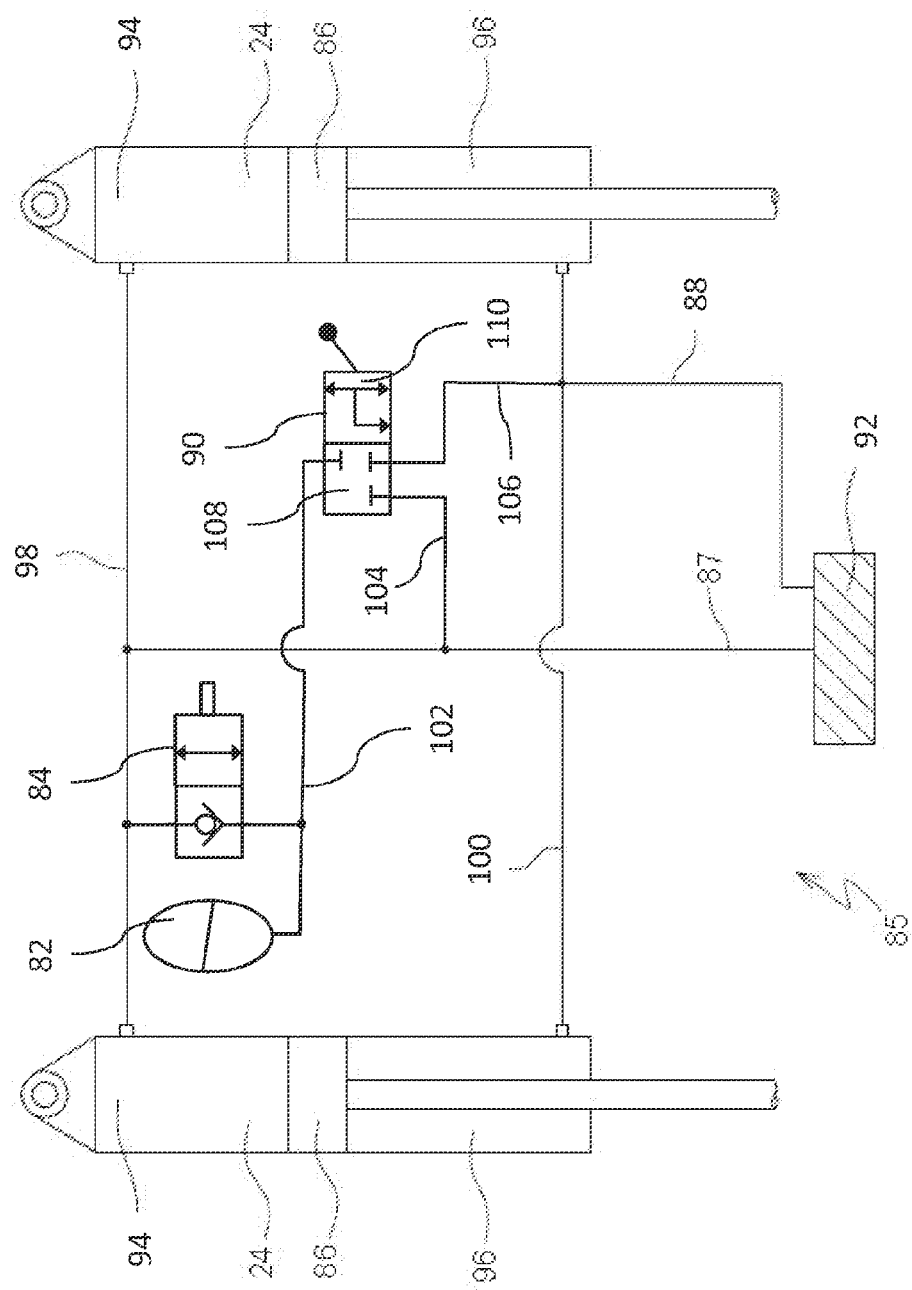
FIG. 11 is a schematic hydraulic circuit diagram for a first embodiment of a front loader arrangement with a hydraulic spring suspension and adjusting means for producing a floating position for the hydraulic cylinders.

The front loader 13 furthermore has a device for the hydraulic spring suspension of the front loader arm 20, wherein the device comprises a hydraulic accumulator 82 in conjunction with a control valve 84 that is controlled by load pressure, the control valve 84 being depicted in FIGS. 11 and 12, in which a part of a hydraulic system 85 respectively for the hydraulic supply of two double-acting lifting cylinders 24 is depicted, the lifting cylinders having a piston 86 and being hydraulically supplied via a hydraulic supply line 87 and a hydraulic supply line 88, the supply lines both emanating from a coupling part 92 of a quick coupler (not shown). The hydraulic accumulator 82 can be used via the control valve 84 for the spring suspension of the lifting cylinders 24, with reference being made here to a conventional spring suspension which, since it is known, does not require a more detailed description.

In order to make coupling easier, it is expedient, as has been previously described, that during the coupling, the mounting masts 18 can be moved and adapted as freely as possible to the position of the mounting frame 16 so that the bearing bolts 44, 46 are guided as exactly and precisely as possible into the catch hooks 36, 38. This is achieved by cancelling the rigid connection between the mounting mast 18 and the front loader arm 20, which results when the hydraulic fluid supply and associated control valve is disconnected at the quick coupler (not shown) causing the lifting cylinders 24 to remain fixed in the position which they have last taken up thereby holding the mounting masts 18 rigidly with respect to the front loader arm 20. The mounting masts 18 are thereby brought into a movable state in which the mounting masts can be pivoted relative to the front loader arm 20. For this purpose, as FIGS. 11 and 12 schematically show, a shut-off valve 90 is provided, wherein, FIG. 11 depicts a first exemplary embodiment, and FIG. 12 depicts a second exemplary embodiment, of a hydraulic system 85 for double-acting lifting cylinders with a device for the hydraulic spring suspension of the mounting masts 18.

In both cases, the shut-off valve 90 is designed to be actuated manually and can be operated by an operator, during the coupling and decoupling of the front loader 13, when the hydraulic fluid supply and associated control valve (not shown) is connected or disconnected from the hydraulic system 85.

With regard to FIG. 11, part of the hydraulic system 85 for supplying hydraulic fluid to the two double-acting lifting cylinders 24 is depicted, the lifting cylinders each having a piston 86 and having fluid supplied via the fluid supply line 87 and via the fluid supply line 88. The supply line 87 extends from a coupling part 92 of a quick coupler (not shown) to head end chambers 94 of lifting cylinders 24, while the supply line 88 extends from the coupling part 92 to rod end chambers 96. As can be seen in FIG. 1, the head end of the right lifting cylinder 24 is connected to the front loader arm 20 and the rod end is connected to the right mounting mast 18, with it being noted that the left lifting cylinder 24 is similarly connected between the loader arm 20 and the left mounting mast 18. Therefore, the front loader arm 20 can be raised and lowered by respectively directing hydraulic fluid to, and draining hydraulic fluid from, the rod end chambers 96, wherein a control valve (not shown) of the hydraulic system 85 is correspondingly activated in a known manner in order to lift and lower the front loader arm 20. The head end chambers 94 of the two lifting cylinders 24 are connected to each other by a connecting line 98 that is connected to the supply line 87. Furthermore, the rod end chambers 96 of the lifting cylinders 24 are connected to each other by a connecting line 100 which is connected to the fluid supply line 88. As a result, the two hydraulic cylinders 24 are pressurized uniformly. The hydraulic accumulator 82 makes a first connection with the shut-off valve 90 by a connecting line 102. Furthermore, a connecting line 104 leads from the fluid supply line 87 to a second connection with the shut-off valve 90, and a further connecting line 106 leads from the supply line 88 to a third connection with the side of the shut-off valve 90. The shut-off valve 90 has a first or off switching position 108, that shown in FIG. 11) in which all of the connections are closed, and therefore a fluid connection is not produced between the connecting lines 102, 104 and 106. Furthermore, the shut-off valve 98 has a second or open switching position 110 in which three connecting lines 102, 104 and 106 are brought into fluid connection. By opening the shut-off valve 90, i.e., by switching the shut-off valve 90 into the open switching position 110, it can be ensured that when the hydraulic fluid supply is decoupled, hydraulic fluid is not trapped in the chambers 94, 96, but rather can escape into the hydraulic accumulator 82 and into the respective other chamber 94, 96, and vice versa. As a result, the lifting cylinders 24 can take up a floating position in which the pistons 86 are freely movable, wherein volume differences between the head end chambers 94 and the rod end chambers 96 are compensated for by the hydraulic accumulator 82. This state, in turn, permits a relatively free movement of the mounting masts 18 in relation to the front loader arm 20, and therefore, when the shut-off valve 90 is open, each mounting mast 18 can be aligned for connection with a respective mounting frame 16 in a freely pivoted manner during the coupling. The opening of the shut-off valve 90 during the decoupling of the front loader 13 can be carried out here by an operator in one working sequence together with an unlocking of the pivoting locking bar 54 and the separating of the hydraulic fluid supply and associated control valve (separating of the quick coupler). Owing to the fact that the opening of the shut-off valve 90 already takes place during the decoupling of the front loader 13, the shut-off valve 90 is also already prepared here for the next coupling operation, and therefore an operator can couple the front loader 13 to the freely movable mounting masts 18 without leaving the tractor 10. After the coupling of the front loader 13, the shut-off valve 90 has to be closed for the starting up of the hydraulic function (connecting of the hydraulic fluid supply) in order to ensure a hydraulic operation of the front loader 13. However, this can likewise take place in one working sequence together with the connection of the quick coupler.

In the alternative exemplary embodiment illustrated in FIG. 12, there is a further (second) hydraulic accumulator 112 which is connected to the shut-off valve 90 via a connecting line 114, wherein the connecting line 102 from FIG. 11 is dispensed with here, and the further hydraulic accumulator 112, instead of the connecting line 102 from FIG. 11, is connected to the shut-off valve 90. Furthermore, a further connecting line 116 which extends between the supply line 87 and the connecting line 114 is provided. A check valve 118 closing in the direction of the further hydraulic accumulator 112 is arranged in the connecting line 116. In the exemplary embodiment with respect to FIG. 12, the first hydraulic accumulator 82, in contrast to the exemplary embodiment in FIG. 11, is used only for the hydraulic spring suspension of the lifting cylinders 24 and is not used for equalizing the volume between the chambers 94, 96 when switching on the floating position. In the first switching position 108, the shut-off valve 90 closes all of the connections, and therefore a fluid connection is not produced between the connecting lines 104, 106 and 114. By contrast, in the second switching position 110, a fluid connection is produced between the connecting lines 104, 106 and 114. The remaining configuration of the hydraulic circuit is comparable to the manner of operation illustrated in FIG. 11, except that here the connecting line 116 is also provided in conjunction with the check valve 118 in order to relieve the further hydraulic accumulator 112 of pressure. By opening of the shut-off valve 90, i.e., by switching the shut-off valve 90 into the opened switching position 110, the connecting lines 104, 106 and 114 are brought into fluid connection, as a result of which it can be ensured that, when the hydraulic fluid supply is decoupled, the hydraulic fluid is not trapped in the chambers 94, 96, but rather can escape into the further hydraulic accumulator 112 and into the respective other chamber 94, 96, and vice versa. As a result, the lifting cylinders 24 can take up a floating position in which the pistons 86 are freely movable, wherein volume differences between the head end chambers 94 and the rod end chambers 96 are compensated for by the further hydraulic accumulator 112. This state, in turn, also permits a relatively free movement here of the mounting mast 18 in relation to the front loader arm 20, and therefore, when the shut-off valve 90 is open, the mounting mast 18 can be freely pivoted into alignment with the associated mounting frame 16 during the coupling. The opening of the shut-off valve 90 during the decoupling of the front loader 13 can be carried out here by an operator in one working sequence together with unlocking of the pivoting locking bar 54 and the separating of the hydraulic supply (separating of the quick coupler). Owing to the fact that the shut-off valve 90 is already opened during the decoupling of the front loader 13, the latter is also already prepared here for the next coupling operation, and therefore an operator can couple the front loader 13 including the freely movable mounting masts 18 to the mounting frames 16 without leaving the tractor 10. The shut-off valve 90 has to be closed after the coupling of the front loader 13, for the starting up of the hydraulic function (connecting of the hydraulic fluid supply), in order to ensure a hydraulic operation of the front loader 13. However, this can likewise take place in one working sequence together with the connection of the quick coupler.

Having described the preferred embodiment, it will become apparent that various modifications can be made without departing from the scope of the invention as defined in the accompanying claims.

The invention claimed is:

1. In a front loader arrangement (12) including a mounting frame (16) and a mounting mast (18), wherein the mounting mast (18) can be coupled to the mounting frame (16) and can be decoupled therefrom, a front loader arm (20) having a rear end connected to the mounting mast (18) for pivoting vertically relative to the mounting mast (18), and a hydraulic system (85), adapted for being coupled to a hydraulic fluid supply and associated control valve, incorporating a double-acting hydraulic cylinder (24) extending between the front loader arm (20) and the mounting mast (18) and including a head end chamber (94) and a rod end chamber (96), and further incorporating a device for the hydraulic spring suspension of the front loader arm (20) defined in part by a hydraulic accumulator (82) in conjunction with a load-pressure-controllable control valve (84), the improvement comprising: said hydraulic system (85) further incorporating an adjusting means, by means of which the hydraulic cylinder (24) can be brought into a floating position when the hydraulic fluid supply is decoupled from the hydraulic system (85); said adjusting means comprising a shut-off valve (90) coupled between the head end and rod end chambers (94) which has a first switching position (108) blocking fluid communication between the head end and rod end chambers (94, 96) and a second switching position (110) establishing a fluid connection between the head end and rod end chambers (94, 96).

2. The front loader arrangement (12), as defined in claim 1, wherein, said shut-off valve (90) is coupled to said hydraulic accumulator (82) and, when in said second switching position (110), also establishes a fluid connection between the hydraulic accumulator (82) and the head end and rod end chambers (94, 96).

3. The front loader arrangement (12), as defined in to claim 2, wherein, said shut-off valve (90), when in said first switching position (108), acts to interrupt a fluid connection between the head end and rod end chambers (94, 96).

4. In a front loader arrangement (12) including a mounting frame (16) and a mounting mast (18), wherein the mounting mast (18) can be coupled to the mounting frame (16) and can be decoupled therefrom, a front loader arm (20) having a rear end connected to the mounting mast (18) for pivoting vertically relative to the mounting mast (18), and a hydraulic system (85), adapted for being coupled to a hydraulic fluid supply and associated control valve, incorporating a double-acting hydraulic cylinder (24) extending between the front loader arm (20) and the mounting mast (18) and including a head end chamber (94) and a rod end chamber (96), and further incorporating a device for the hydraulic spring suspension of the front loader arm (20) defined in part by a hydraulic accumulator (82) in conjunction with a load-pressure-controllable control valve (84), the improvement comprising: said hydraulic system (85) further incorporating an adjusting means, by means of which the hydraulic cylinder (24) can be brought into a floating position when the hydraulic fluid supply is decoupled from the hydraulic system (85); said adjusting means comprising a shut-off valve (90) coupled between the head end and rod end chambers (94) which has a first switching position (108) blocking fluid communication between the head end and rod end chambers (94, 96) and a second switching position (110) establishing a fluid connection between the head end and rod end chambers (94, 96); and wherein a further hydraulic accumulator (112) is connected between said head end and rod end chambers (94, 96) by way of said shut-off valve (90); and said shut-off valve (90), when in the said second switching position (110), establishing a fluid connection between the head end chamber (94), the rod end chamber (96) and the further hydraulic accumulator (112).

5. The front loader arrangement (12), as defined in claim 4, wherein said shut-off valve (90), when in said first switching position (108), acts to interrupt a fluid connection between the head end chamber (94), the rod end chamber (96) and the further hydraulic accumulator (112).

6. The front loader arrangement (12), as defined in claim 4, wherein a bypass line (116) is arranged between the further hydraulic accumulator (112) and the head end chamber (94); and a check valve (118) is located in the bypass line (116) and closes in the direction of the further hydraulic accumulator (112).

7. An agricultural vehicle (10) equipped with a front loader arrangement (12) as defined in any one of claims 1 to 6.

* * * * *